United States Patent
Lindemann et al.

(10) Patent No.: US 10,160,340 B2
(45) Date of Patent: Dec. 25, 2018

(54) ADAPTIVE SYSTEM AND METHOD FOR OPTIMIZING BATTERY LIFE IN A PLUG-IN VEHICLE

(71) Applicant: GM GLOBAL TECHNOLOGY OPERATIONS LLC, Detroit, MI (US)

(72) Inventors: Todd P. Lindemann, Howell, MI (US); Rory B. Fraga, Troy, MI (US); Patricia M. Laskowsky, Ann Arbor, MI (US); Patrick E. Frost, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 15/071,588

(22) Filed: Mar. 16, 2016

(65) Prior Publication Data

US 2017/0267116 A1    Sep. 21, 2017

(51) Int. Cl.
*B60L 11/18*    (2006.01)
*B60L 3/12*    (2006.01)

(52) U.S. Cl.
CPC ............ *B60L 11/1857* (2013.01); *B60L 3/12* (2013.01); *B60L 11/1809* (2013.01); *B60L 11/1816* (2013.01); *B60L 11/1838* (2013.01); *B60L 11/1861* (2013.01); *B60L 2230/16* (2013.01); *B60L 2240/545* (2013.01); *B60L 2240/547* (2013.01); *B60L 2240/549* (2013.01); *B60L 2240/80* (2013.01)

(58) Field of Classification Search
CPC ............ B60L 11/1857; B60L 11/1861; B60L 11/1809
See application file for complete search history.

(56) References Cited

U.S. PATENT DOCUMENTS

| 2014/0278167 A1 | 9/2014 | Frost et al. | |
| 2015/0097512 A1* | 4/2015 | Li | B60L 11/182 320/101 |
| 2016/0103185 A1* | 4/2016 | Chang | G01R 31/362 324/429 |
| 2016/0311330 A1* | 10/2016 | Liu | B60L 11/1864 |

OTHER PUBLICATIONS

U.S. Department of Energy Vehicle Technologies Program, Battery Test Manual for Electric Vehicles, Jun. 2015 (Year: 2015).*

* cited by examiner

*Primary Examiner* — Kimberly S Berona
*Assistant Examiner* — Jordan S Fei
(74) *Attorney, Agent, or Firm* — Quinn IP Law

(57) ABSTRACT

A system for optimizing life of a battery pack in a plug-in vehicle includes sensors for measuring battery performance data, including an open-circuit voltage, charging current, and/or temperature of the battery pack, a GPS receiver, a user interface, and a controller. The controller executes a method to monitor degradation of the battery pack using the performance data, and determines driving and charging histories for an operator of the vehicle using the measured battery performance data and a position signal from the GPS receiver. The histories identify the days, hours, and locations at which the operator has driven the vehicle and charged the battery pack. The controller identifies a state of charge data bin missing performance data or containing old performance data. The controller then controls a charging operation of the battery pack via a charging control signal, and records the measured battery performance data for the identified SOC data bin.

19 Claims, 2 Drawing Sheets

ADAPTIVE SYSTEM AND METHOD FOR OPTIMIZING BATTERY LIFE IN A PLUG-IN VEHICLE

TECHNICAL FIELD

The present disclosure relates to an adaptive system and method for optimizing battery life in a plug-in vehicle.

BACKGROUND

High-voltage batteries may be used to energize electric machines in a variety of different systems. For instance, output torque from an electric machine may be used to power an input member of a transmission in a plug-in vehicle, i.e., a vehicle having a battery pack that may be recharged via a charging outlet or other offboard power supply. The individual cells of a battery pack gradually age and degrade over time. As a result, battery performance parameters such as open circuit voltage, cell resistance, and state of charge may change relative to calibrated/new values. Battery degradation is therefore typically monitored by a designated controller in order to estimate the amount of electrical energy remaining in the battery pack. Electric vehicle range estimates can be generated from the estimated electrical energy and thereafter used for effective route planning, and/or to execute automatic powertrain control actions.

Several factors can contribute to battery degradation and shorten battery life. For instance, battery packs that are maintained at a high state of charge level tend to degrade much faster than battery packs maintained within a lower, more optimal state of charge range. Higher battery charging currents and temperatures can also shorten battery life. Battery packs of the types typically used in plug-in vehicles are trending toward larger sizes suitable for longer all-electric driving distances, in some cases well over 200 miles on full charge. However, range anxiety and other factors such as time constraints, personal driving habits, and a limited appreciation for battery physics may lead to preferred battery charging habits that can shorten battery life. For instance, if a given operator's normal daily electric driving range is 30-50 miles in a vehicle having a fully-charged electric operating range of 200 miles, the act of fully charging the battery pack at every charging event will result in maintenance of a high state of charge throughout the duration of ownership of the vehicle. This in turn may reduce battery life, and can adversely affect the accuracy of electric range estimates over time.

SUMMARY

A system and an adaptive method are disclosed herein that together allow an operator of a plug-in vehicle to extend the life of a vehicle battery pack and improve the overall accuracy of any onboard electric range estimates. Over time, a controller monitors and learns the operator's personal driving habits, energy use, and battery charging behavior. Charging of the battery pack is automatically controlled in response to various sensor inputs. Life of the battery pack is thereby extended and optimized for a given operator of the vehicle by selectively charging the battery pack to a state of charge (SOC) level that more closely matches an optimal SOC level needed for optimizing battery life, and by selectively controlling the charging operation so as to fill designated data bins corresponding to SOC ranges as disclosed herein.

In particular, an example system is disclosed herein for use in a plug-in vehicle. The system includes sensors, a global positioning system (GPS) receiver, a user interface, and a controller. The sensors are collectively operable for measuring battery performance data of a battery pack of the vehicle, with the battery performance data including an open-circuit voltage, SOC level, charging current, and/or a temperature of the battery pack. The GPS receiver is operable for determining a position of the vehicle, which is then tracked over time to allow the controller to build and record a driving history for a given operator. The controller, which is in communication with the user interface and the GPS receiver, is programmed to monitor degradation of the battery pack over time using the measured battery performance data.

The controller is further programmed to determine the driving history and a battery charging history for the operator using the measured battery performance data as well as a position signal from the GPS receiver, with the driving history and battery charging history identifying the days, hours, and locations during/at which the operator drives the vehicle and charges the battery pack, respectively. The controller also identifies, from among a plurality of SOC data bins each configured to store the measured battery performance data for a predetermined SOC range, a data bin that is missing battery performance data or which contains old battery performance data relative to a calibrated aging threshold. The controller automatically controls a charging operation of the battery pack via a charging control signal, and also records the measured battery performance data for the identified data bin.

A method is also disclosed herein for optimizing life of a battery pack in a plug-in vehicle. In a particular embodiment, the method includes measuring battery performance data of the battery pack via a plurality of sensors, including measuring an open-circuit voltage of the battery pack, and also determining a position of the vehicle using a GPS receiver. The method also includes monitoring degradation of the battery pack over time via a controller using the measured battery performance data, as well as determining a driving history and a battery charging history for an operator of the vehicle using the measured battery performance data and a position signal from the GPS receiver.

Additionally, the method includes identifying, via the controller from a plurality of SOC data bins each configured to store the measured battery performance data for a predetermined SOC range, a data bin that is missing battery performance data or which contains old battery performance data relative to a calibrated aging threshold, and then automatically controlling a charging operation of the battery pack via the controller using a charging control signal. The method includes recording the measured battery performance data for the identified data bin. In this manner, the life of the battery pack may be optimized relative to systems using conventional approaches.

The above noted and other features and advantages of the present disclosure are readily apparent from the following detailed description of the best modes for carrying out the disclosure when taken in connection with the accompanying drawings.

DETAILED DESCRIPTION

Figure 1:
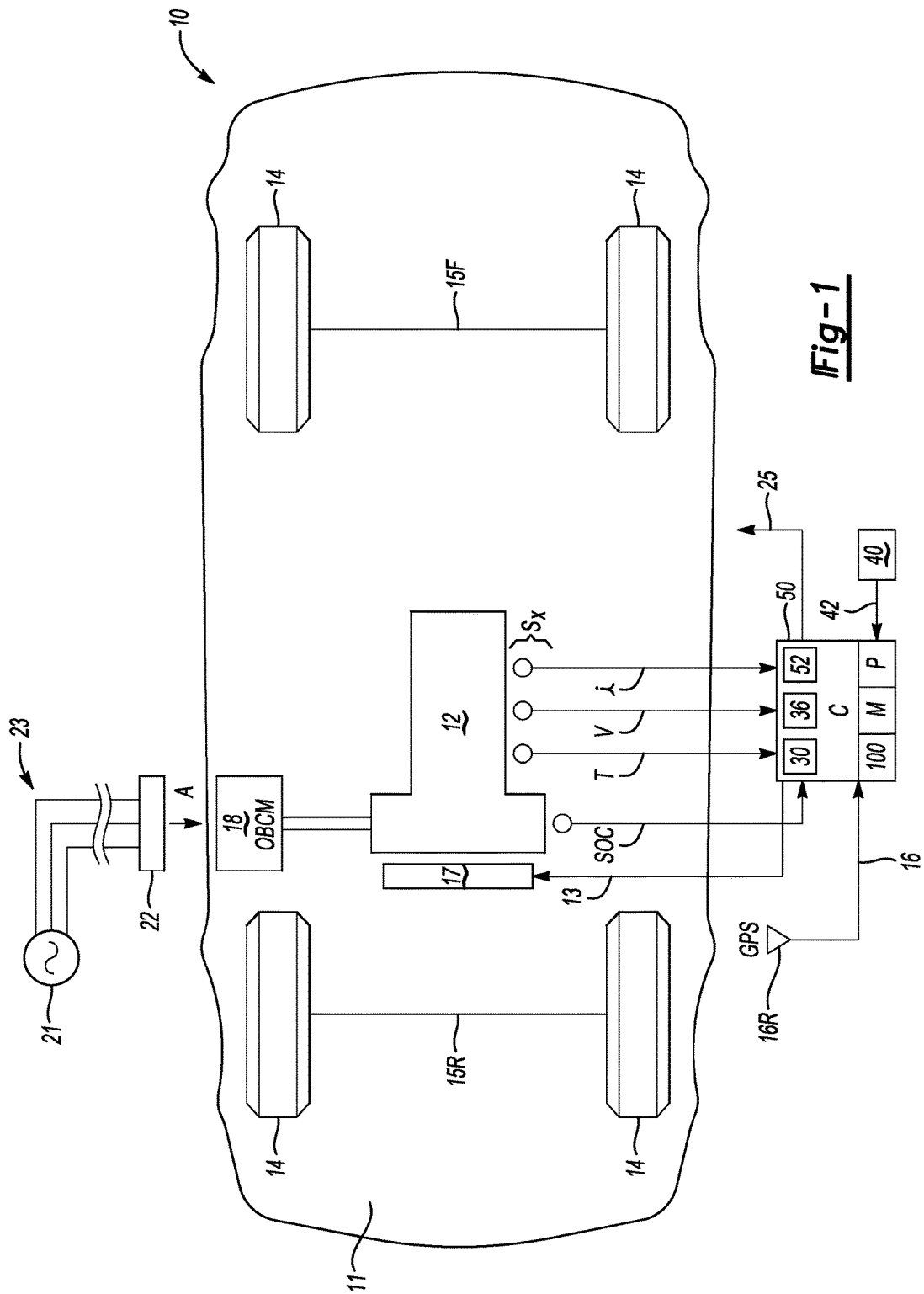
FIG. 1 is a schematic illustration of an example plug-in vehicle having a rechargeable battery pack and a system for optimizing life of the battery pack.

Referring to the drawings, wherein like reference numerals are used to identify like or identical components in the various views, FIG. 1 schematically illustrates an example plug-in vehicle 10 having a chassis 11, a rechargeable battery pack 12, and a controller (C) 50 programmed with a set of battery degradation monitoring logic 30. The vehicle 10 also includes a global positioning system (GPS) receiver 16R operable for receiving position data from a set of GPS satellites (not shown), and for providing the controller 50 with a corresponding position signal (arrow 16) describing the geographic coordinates of the vehicle 10 on a geocoded map, as is well known in the art.

The controller 50 is programmed to record the driving and charging history of a given operator of the vehicle 10 over time, and to use the recorded driving and charging histories to improve the accuracy of the battery degradation monitoring logic 30. Additionally, the controller 50 is programmed to automatically control a charging operation of the battery pack 12 as set forth below with reference to FIGS. 2 and 3 in a manner that fills designated SOC data bins during predicted gaps in the operator's schedule and thereby helps extend the useful life of the battery pack 12.

The vehicle 10 of FIG. 1 may include an electric powertrain (not shown) in which one or more electric machines draw electrical power from the battery pack 12 and deliver motor torque to drive wheels 14 via one or more front and/or rear drive axles 15F and/or 15R. The controller 50 automatically executes instructions embodying a method 100 to thereby extend and optimize the life of the battery pack 12, informed in part using information contained in the GPS position signal (arrow 16) from the GPS receiver 16R as well as information from the battery degradation monitoring logic 30.

The vehicle 10 may be embodied as any mobile platform whose battery pack 12 can be selectively recharged by connection to an offboard power supply 21 such as a 120 VAC or 240 VAC wall outlet or electric charging station. The vehicle 10 may include an onboard charging module (OBCM) 18 of the type known the art. The OBCM 18 can be selectively connected to the power supply 21 via an electrical connector 22 and suitable electrical cables 23, as indicated by arrow A. The OBCM 18 converts AC power from the power supply 21 into DC power suitable for increasing an SOC level of the battery pack 12. In various embodiments, the vehicle 10 may be an extended-range electric vehicle or a battery electric vehicle, with the latter typically having an electric vehicle operating range of 40-200 miles or more on a fully charged battery pack 12 when such a battery pack 12 is new.

The vehicle 10 of FIG. 1 may also include a thermal conditioning device 17 operable for heating or cooling the battery pack 12 as needed, which may be accomplished via transmission of a thermal control signal (arrow 13) from the controller 50 as part of the method 100. Also as part of the method 100, the vehicle 10 is equipped with a plurality of battery sensors ($S_X$) each operable for measuring and/or otherwise determining a corresponding performance parameter of the battery pack 12. For instance, the various battery sensors $S_X$ may be used to directly measure or help determine a state of charge (arrow SOC), and may include a temperature sensor operable for measuring a battery temperature (arrow T), a voltage sensor operable for measuring the battery voltage (arrow V), and/or a current sensor for determining a battery current (arrow i) of individual battery cells or groups of battery cells (not shown) of the battery pack 12, with such values transmitted or otherwise reported to the controller 50.

As is known in the art, the SOC of a battery such as the battery pack 12 may be determined by different methods, such as the use of an equivalent circuit to model the battery pack 12 and account for surface charge on the various conductive plates (not shown) of the battery pack 12. The controller 50 uses the collected battery performance parameters in the execution of the battery degradation monitoring logic 30 to thereby determine or estimate the amount of electrical energy remaining in the battery pack 12 and also estimate a remaining electric vehicle range, as is well understood in the art.

The controller 50 may automatically determine the voltage (arrow V) as an open-circuit voltage after the vehicle 10 is at rest for a calibrated duration, i.e., when the vehicle 10 is off or not running. Use of the battery degradation monitoring logic 30 may optionally entail comparing a shape of a measured open-circuit voltage curve against a calibrated/new open-circuit voltage curve, and estimating the amount of energy remaining in the battery pack 12 based on the differences in the OCV curves. The estimated energy can then be used by the controller 50 to estimate a remaining electric operating range of the vehicle 10.

Use of the method 100 is intended to ensure optimal range and life of the battery pack 12 by automatically adapting charging operations to the unique driving and charging behavior of a given operator of the vehicle 10. As such, the controller 50 may record a corresponding driving history and charging history for multiple operators of the vehicle 10, somewhat analogous to the manner in which different seating positions or steering wheel height settings are stored for different operators. Specifically, the method 100 takes into account the need to collect battery information at lower or higher SOC levels of the battery pack 12 in order to better estimate the true electrical capacity and remaining electrical range of the battery pack 12.

Use of the method 100 results in automatic adjustment of a normally-used SOC range via charging control signals (arrow 25) communicated to the OBCM 18 when the battery pack 12 is plugged in and is actively charging. This control action is intended to better meet the needs of the battery degradation monitoring logic 30 in providing the most accurate estimations and electric range predictions, while still allowing the battery pack 12 to power the vehicle 10 through a given operator's unique driving and charging habits.

An operator of the vehicle 10 may be provided with an option to disable execution of the method 100, and thus control the charging operation in a particular manner, via receipt of an override signal (arrow 42) from a user interface 40, e.g., a cell phone, tablet, or touch screen. An operator may decide, for instance, to temporarily prevent active charging control for optimization of the battery degradation monitoring logic 30 in situations in which the operator expects a deviation in the operator's normal driving behavior, such as travel to an unanticipated meeting instead of remaining parked at a charging station. The controller 50 can then automatically control the charging operation by charging the battery pack 12 to a default SOC in response to receipt of the override signal (arrow 42), such as by allowing charging of the battery pack 12 to a full SOC, thus providing the operator with the full energy capacity of the battery pack 12.

The controller 50 of FIG. 1 may be embodied as one or more distinct devices, each possibly having one or more microcontrollers or central processing units (P) and memory (M), e.g., read only memory, random access memory, and electrically-erasable programmable read only memory. The controller 50 and interactive user interface 40 may include a calendar 52, recorded charging control targets 36 as explained below, a high-speed clock, input/output circuitry, and/or any other circuitry that may be required to perform the functions described herein. In different configurations, the user interface 40 and the controller 50 may be the same device or separate devices. The controller 50 may be configured to run/execute various software programs, including the battery degradation monitoring logic 30.

The user interface 40 and the controller 50 may be digitally interconnected with the memory (M), and may be configured to retrieve and execute such software applications in a manner that is known in the art. Likewise, the user interface 40 may include a liquid crystal display, a light emitting diode display, an organic light emitting diode display, and/or any similar style display/monitor that may exist or that may be hereafter developed. In different embodiments, the user interface 40 may be a touch-sensitive screen of a navigation or infotainment system located in a center stack (not shown) of the vehicle 10, and/or of a cell phone or other portable electronic device. A capacitive or touch-based digitizer may be integrated within the user interface 40 and operable to detect contact from an operator as the override signal (arrow 42) and automatically convert the digitized contact into a suitable input signal usable by the controller 50.

With respect to the battery degradation monitoring logic 30, the method 100 is intended to enable battery performance data to be collected in all required SOC ranges or regions, including those that might not otherwise be collected with the frequency necessary for accurately monitoring or tracking battery degradation. Also, the calculation and display of an estimated electric range to an operator of a vehicle having an electric powertrain, such as the example vehicle 10 of FIG. 1, is an important part of minimizing operator range anxiety. Such range anxiety is an underlying cause of gaps in the range of battery performance data typically collected and made available to the battery degradation monitoring logic 30. Operators tend to feel comfortable operating within a particular range of their office, home, or other preferred charging station, or tend to initiate charging of the battery pack 12 when the battery pack 12 retains a relatively high charge level, doing so in order to avoid the possibility of depleting the battery pack 12. Such a scenario is analogous to that of an operator of a conventional vehicle refilling a fuel tank when the fuel tank remains half full, or that of always charging a laptop computer when the state of charge remains well above 50%. However, maintaining SOC at a high level can degrade the battery pack 12 over time, as noted above. The method 100 is intended to prevent such degradation while still optimizing performance of the battery degradation monitoring logic 30.

Figure 2:
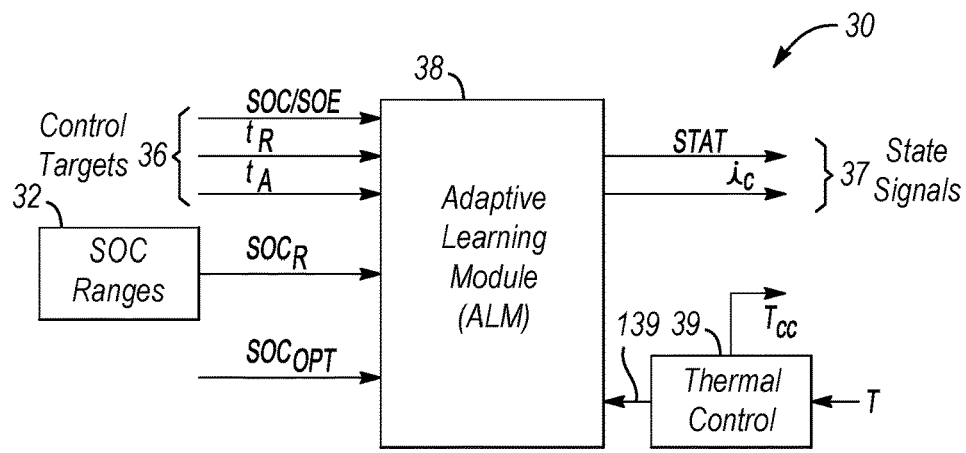
FIG. 2 is a schematic logic flow diagram for a controller usable as part of the system shown in FIG. 1.

Referring to FIG. 2, which depicts logic flow through the controller 50 of FIG. 1, the controller 50 may be programmed with an adaptive learning module (ALM) 38 that optimizes charging of the battery pack 12. As noted above, the battery degradation monitoring logic 30 may in some embodiments use measured open-circuit voltage (OCV) after the vehicle 10 is at rest/turned off for a calibrated duration, with the controller 50 comparing a shape of a measured OCV curve plotting OCV versus time against a calibrated/new OCV curve for a calibrated/new battery pack 12, and thereby estimating the amount of energy remaining in the battery pack 12, e.g., as a function of the difference between the actual and new OCV curves. The battery degradation monitoring logic 30 may be programmed to divide the SOC of the battery pack 12 into data SOC regions or data bins, for instance 5% or 10% SOC increments. Estimated energy in the battery pack 12 can then be used to estimate a remaining electric vehicle operating range of the vehicle 10, with the accuracy of the estimation depending on the existence and timeliness of such OCV or other battery performance data in each of the data bins.

At a logic block 32, for instance, the controller 50 may determine the particular state of charge ranges needed for optimization of the battery degradation monitoring logic 30. By way of example, the full state of charge range of the battery pack 12 may be divided into a plurality of SOC data regions or bins, e.g., ten data bins using the 10% SOC increment example noted above. The controller 50 may also be programmed with a calibrated aging threshold, such that collected battery performance data in each of the data bins may be evaluated for "staleness", i.e., in as being too old or dated to be useful. The controller 50 can therefore review each of the data bins and determine those containing minimal, missing, or stale collected battery performance data. The controller 50 can then generate an SOC request signal (arrow $SOC_R$) requesting collection of an OCV measurement or other battery performance data for the identified data bin(s).

The controller 50 may also determine the control targets 36 for the SOC or state of energy (SOE), as well as the time required ($t_R$) and time available ($t_A$) for achieving such targets. The time available ($t_A$) may be determined by the controller 50 using the past driving history of the operator, such as by knowing precisely how long the operator remains at work on a typical weekday, or how long the battery pack 12 remains plugged into the offboard charging station 21 of FIG. 1 for a given charging operation. The adaptive learning module 38 is also programmed with a calibrated optimal state of charge ($SOC_{OPT}$) for the battery pack 12, e.g., 50-60% SOC, which the controller 50 may attempt to maintain at times other than when actively controlling charging operations to fill particular data bins.

The controller 50 then determines the particular charging strategy to be implemented. Specifically, the controller 50 determines when to initiate charging of the battery pack 12, when to interrupt or discontinue such charging, the level of charging current to use, when to complete charging, and the state of charge level to use as a threshold for determining when charging is complete. The various actions taken by the adaptive learning module 38 are explained in further detail below with reference to the method 100 depicted in FIG. 3.

The adaptive learning module 38 then outputs state signals 37, including a charging status signal (arrow STAT) indicative of whether charging operations are pending, active, or complete, and a charging current level (arrow $i_C$). Optionally, a thermal control module 39 of the controller 50, or a separate control device, may be used to control operation of the thermal conditioning device 17 shown in FIG. 1. The thermal control module 39 may receive the measure temperature (arrow T) and then determine, based on the measured temperature (arrow T), whether/when to command heating or cooling the battery pack 12 of FIG. 1 prior to or concurrent with charging operations. The thermal conditioning device 17 can then transmit a thermal conditioning control signal (arrow $T_{CC}$) to the thermal conditioning device 17 to command the required heating or cooling action, and a status signal (arrow 139) to the adaptive learning module 38.

Thermal conditioning of the battery pack 12 can be automatically adjusted by the controller 50 in this manner to maximize battery conditioning while the vehicle 10 remains plugged in. Using a tighter optimal temperature constraint may have the result of using more energy from the offboard power supply 21. However, doing so may improve the longevity of the battery pack 12. The controller 50 may be programmed in some embodiments to derate a charging current level to the battery pack 12 to maintain the SOC of the battery pack 12 at a particular level until such thermal conditioning of the battery pack 12 is complete.

Using the adaptive learning module 38, the controller 50 may optionally consider available regeneration energy due to elevation of the vehicle 10 over the course of an operator's normal driving route. Whether the operator works, lives, drives, or charges at a higher elevation, the elevation history may be used by the controller 50 to schedule regenerative charging events, which as is known in the art involves the use of one of more electric machines, i.e., motor/generator units, connected to the battery pack 12 and controlled as a generator. The adaptive learning module 38 thus accounts for energy that can be directed into the battery pack 12 thorough regeneration, and can use the elevation knowledge to allow for all possible energy to be captured and used to optimize battery life when automatically scheduling or controlling charging to a particular SOC for a given one of the SOC data bins.

Monitoring of normal charging behavior by the controller 50 tracks locations and the number of charging events normally completed each day of the week, via the calendar 52, in an effort to further optimize life of the battery pack 12. The operator may optionally customize learning to incorporate an additional "range buffer" in terms of a preferred minimal distance to minimize range anxiety. For example, the operator may feel more comfortable with an additional range buffer, e.g., 20-30 miles, such that the battery pack 12 always retains at least enough energy to travel that distance. A default range buffer may be built in to the default settings of the controller 50, with the operator able to increase or decrease the range buffer as desired via the user interface 40. Alternatively, the controller 50 may receive the designated range buffer via the user interface 40 and automatically control the charging operation using the designated range buffer such that the battery pack 12, upon completing a given charging event, has an estimated range that equals or exceeds a range of the designated range buffer.

Figure 3:
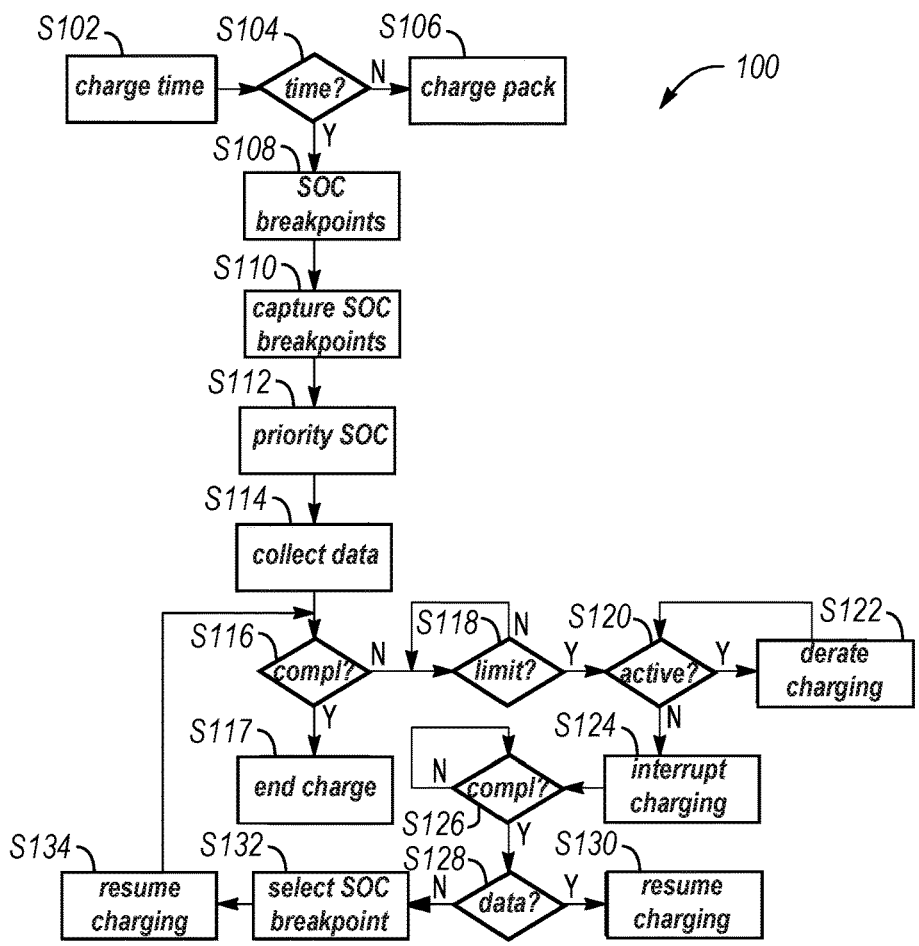
FIG. 3 is a flow chart describing an example adaptive method for optimizing life of a battery pack in a plug-in vehicle such as the example vehicle shown in FIG. 1.

Referring to FIG. 3, an embodiment of the method 100 is depicted for an example charging scenario of the battery pack 12 shown in FIG. 1. The method 100 relies on the controller 50 having previously determined a driving history and a battery charging history for an operator of the vehicle 10 using the measured battery performance data and the position signal (arrow 16) from the GPS receiver 16R of FIG. 1. The past driving history and battery charging history identify the days, hours, and locations at which the operator has driven the vehicle 10 or charged the battery pack 12, respectively. As most operators will tend to drive/charge a certain way on a given day, such as commuting to/from work on weekdays and traveling in a different manner on weekends, and will also tend to repeat those patterns from week to week, the calendar 52 can be used to track actual behavior over time and control the charging operation based on such histories as set forth in FIG. 3.

As an underlying part of method 100, the controller 50 must identify, from a plurality of SOC data bins each configured to store the measured battery performance data for a predetermined SOC range, an SOC data bin that is missing battery performance data or which contains old battery performance data relative to a calibrated aging threshold. The controller 50 then automatically controls a charging operation of the battery pack 12 via the charging control signal (arrow 25) of FIG. 1 until an actual SOC of the battery pack 12 is within an SOC range defining the identified SOC data bin, and records the measured battery performance data for the identified SOC data bin.

In a particular embodiment, method 100 includes step S102, wherein for a given charging event the controller 50 determines the amount of time required for charging the battery pack 12 to a full/100% charge capacity. As part of step S102, the controller 50 collects information about the current performance of the battery pack 12, e.g., its present SOC, temperature, voltage, current, etc., as well as knowledge of the voltage/charging current available via the power supply 21. The method 100 proceeds to step S104 after the time required to charge the battery pack 12 has been determined.

At step S104, the controller 50 next determines if there is sufficient time available to complete a plug-in charging event of the battery pack 12 via the power supply 21 of FIG. 1 without any interruptions. The method 100 proceeds to step S106 if sufficient time is not available, i.e., if the operator's present schedule as determined via the calendar 52 of FIG. 1 and past charging/driving behavior of the operator indicates that all available time for charging must be spent actively charging. In other words, due to time limitations in the operator's schedule, charging cannot be delayed or interrupted to fill designated SOC data bins. However, if sufficient time exists for scheduled charging interruptions, the method 100 proceeds instead to step S108.

At step S106, the controller 50 commences charging of the battery pack 12 without commanding charging delays or interruptions. Execution of step S106 is therefore the ordinary or typical use of the offboard power supply 21, in that the operator connects the battery pack 12 to the power supply 21 and charging continues for the entire duration of the charging event until either the available amount of time for charging elapses or a full charge is attained.

At step S108, the controller 50 determines a number of SOC "breakpoints" between the present SOC detected at step S102 and the control target SOC shown in FIG. 2, and then proceeds to step S110. Such SOC breakpoints may be embodied as the SOC data bins noted above, i.e., calibrated bands or SOC ranges from 0% to 100% SOC. As an illustrative example, if the entire SOC range of 0-100% SOC is divided into ten equal SOC breakpoints or data bins of 0-10%, 11-20%, 21-30%, etc., and the present SOC is 50%, then the result of step S108 is a determination that there are five remaining SOC breakpoints or data bins, i.e., 51-60%, 61-70%, 71-80%, 81-90%, and 91-100%.

Step S110 includes determining, from among the identified breakpoints of step S108, the number of such SOC breakpoints that can be captured in the time available for charging as determined in step S102. The method 100 then proceeds to step S112.

Step S112 includes selecting the highest priority SOC breakpoint from step S110, and then proceeding to step S114 for data collection within this breakpoint. Step S112 may include evaluating each of the SOC breakpoints from step S110 against a given criterion such as age/"staleness" or lack of data in a given SOC data bin. For example, if of the identified data bins there are four such data bins with stale data and one with no data, the controller 50 may prioritize the collection of data in the SOC data bin having no data. Of the remaining SOC data bins, the controller 50 may use age to determine which data bin to collect first, starting with the oldest or stalest of the previously collected data.

At step S114, the controller 50 commences charging of the battery pack for the highest priority breakpoint identified at step S112. Charging operations of a battery such as battery pack 12 of FIG. 1 is known in the art, and may include commanding closing of contactors or relays (not shown) in a circuit between the battery pack 12 and the OBCM 18. Closing of the contactors electrically connects the battery pack 12 to the offboard power supply 21 to commence charging of the battery pack 12. Optionally, the controller 50 may be programmed to automatically control the charging operation by delaying charging of the battery pack 12 for a predetermined duration after the battery pack 12 has been plugged into the offboard power supply 21 of FIG. 1. The method 100 proceeds to step S116 as charging is ongoing.

Step S116 includes determining whether the charging event of step S114 is complete, e.g., by comparing the actual SOC of the battery pack 12 to a control target SOC determined by the controller 50 at the outset of the charging event. The method proceeds to step S117 when the charging event is complete. Otherwise, the method 100 proceeds to step S118.

Step S117 entails ending the charging event that commenced at step S116, e.g., by commanding the breaking of a circuit between the battery pack 12 and the offboard power supply 21.

At step S118, the method 100 determines if the present SOC of the battery pack 12 is equal to or exceeds the limit of the SOC breakpoint. For instance, if the SOC data bin currently being filled is 51-60%, the controller 50 determines that the present SOC exceeds the limit of the SOC breakpoint if the present SOC reaches 60% or more. The method then proceeds to step S120. Step S118 is repeated until the present SOC of the battery pack 12 is equal to or exceeds the SOC breakpoint, and thereafter proceeds to step S120.

At step S120, the controller 50 next determines if a thermal condition is active, such as whether the thermal control module 39 is heating or cooling the battery pack 12 via the thermal conditioning device 17 shown in FIG. 1. If so, the method 100 proceeds to step S122. If not, the controller 50 proceeds instead to step S124.

Step S122 may include derating the charging current level (arrow $i_C$) flowing to the battery pack 12 so as to maintain the SOC of the battery pack 12 until thermal conditioning is complete. Step S120 is then repeated.

Step S124 includes interrupting the charging operation, such as by commanding an opening of any relays or contactors between the power supply 21 and the battery pack 12, or otherwise interrupting a flow of charging current to the battery pack 12. The method 100 then proceeds to step S126.

Step S126 includes determining if the charge interrupt is complete. The method 100 then proceeds to step S128.

At step S128, the controller 50 next determines if data has been collected for all SOC data bins. If so, the method 100 proceeds to step S130. The method 100 proceeds instead to step S132 if data has not been collected for all of the SOC data bins.

At step S130, the controller 50 resumes charging of the battery pack 12 until such charging is complete. For instance, step S130 may include commanding any contactors or relays between to the power supply 21 and the battery pack 12 to close such that charging current can flow to the battery pack 12. Thereafter, charging may continue uninterrupted until completion.

At step S132, the controller 50 may select another SOC breakpoint using the aging or missing data criteria noted above, and then proceed to step S134.

Step S134 includes resuming the charging operation of the battery pack 12, e.g., by closing relays or contactors between the power supply 21 and the battery pack 12. The method 100 then returns to step S116.

By adaptively controlling charging operations in a manner that is informed by demonstrated past driving styles, energy usage, drive distances, and battery conditioning tasks as explained above, the method 100 may help fill SOC data bins within the time allowed in the operator's schedule, as demonstrated through the operator's unique charging and driving histories, and to help improve the life of the battery pack 12. At the same time, the user interface 40 provides an operator with the option of quickly overriding such automatic charging control actions, whether from within the vehicle 10 or via a mobile device. At the same time, by ensuring the battery degradation monitoring logic 30 is always provided with timely SOC date across the full SOC range, the operator may further benefit from a quantifiable state of health of the battery pack 12, e.g., by increasing resale value of the vehicle 10. That is, faced with two otherwise identical vehicles 10, a potentially buyer of one of the vehicles 10 may opt for the vehicle 10 having the battery pack 12 having the longest remaining useful life or highest state of health.

While the best modes for carrying out the disclosure have been described in detail, those familiar with the art to which this disclosure relates will recognize various alternative designs and embodiments lying within the scope of the appended claims. It is intended that all matter contained in the above description and/or shown in the accompanying drawings shall be interpreted as illustrative only and not as limiting.

The invention claimed is:

1. A system for optimizing life of a battery pack in a plug-in vehicle, the system comprising:
a plurality of sensors operable for measuring battery performance data of the battery pack, wherein the battery performance data includes an open-circuit voltage, a charging current, and/or a temperature of the battery pack;
a global positioning system (GPS) receiver operable for receiving position data of the vehicle; and
a controller in communication with the plurality of sensors and the GPS receiver that is programmed to monitor degradation of the battery pack over time using the battery performance data, wherein the controller is further programmed to:
determine a driving history and a battery charging history for an operator of the vehicle using the measured battery performance data and a position signal from the GPS receiver, wherein the driving history and battery charging history identify the days, hours, and/or locations at which the operator has driven the vehicle and charged the battery pack, respectively;
determine a plurality of SOC breakpoints between an actual SOC of the battery pack and a control target SOC;
identify, from among a plurality of state of charge (SOC) data bins each configured to store a corresponding portion of the measured battery performance data for a predetermined SOC range, multiple incomplete/stale SOC data bins within the SOC break points that are missing battery performance data or contain old battery performance data relative to a calibrated aging threshold;

select a highest priority breakpoint by evaluating each of the incomplete/stale SOC data bins against an age criterion and/or a lack of data criterion;

identify, from the multiple incomplete/stale SOC data bins, an incomplete/stale SOC data bin that corresponds to the selected highest priority breakpoint;

automatically control a charging operation of the battery pack via a charging control signal until the actual SOC of the battery pack is within an SOC range defining the incomplete/stale SOC data bin that corresponds to the selected highest priority breakpoint;

determine, while the actual SOC of the battery pack is within the SOC range that defines the incomplete/stale SOC data bin, new battery performance data of the battery pack that corresponds to the incomplete/stale SOC data bin; and record the new battery performance data for the incomplete/stale SOC data bin, thereby optimizing the life of the battery pack.

2. The system of claim 1, wherein the controller is programmed to automatically control the charging operation by delaying charging of the battery pack for a predetermined duration after the battery pack has been plugged into an offboard power supply.

3. The system of claim 1, wherein the plurality of sensors includes a voltage sensor operable for detecting the open-circuit voltage, and wherein the measured battery performance data includes the open-circuit voltage.

4. The system of claim 3, wherein the plurality of sensors also includes a current sensor operable for detecting the charging current, and a temperature sensor operable for measuring a temperature of the battery pack, and wherein the measured battery performance data includes the charging current and the temperature.

5. The system of claim 1, wherein the vehicle further includes a thermal conditioning device operable for thermally conditioning the battery pack, and wherein the controller is further programmed to automatically control the charging operation by controlling an operation of the thermal conditioning device in response to the temperature of the battery pack.

6. The system of claim 5, wherein the controller is programmed to derate a charging current level to the battery pack so as to maintain the SOC of the battery pack until the thermal conditioning of the battery pack is complete.

7. The system of claim 1, wherein the controller is further programmed to:

receive an override signal from a user interface of the plug-in vehicle, and automatically control the charging operation by charging the battery pack to a default SOC in response to receipt of the override signal.

8. The system of claim 1, wherein the controller is further programmed to:

determine, from the position signal received from the GPS receiver, an elevation of the plug-in vehicle, and schedule the charging operation to coincide with a regenerative event of the vehicle using the elevation of the plug-in vehicle.

9. The system of claim 1, wherein the controller is further programmed to:

receive a designated range buffer via a user interface of the plug-in vehicle, and automatically control the charging operation using the designated range buffer such that the battery pack, upon completing a charging event, has an estimated range that equals or exceeds a range of the designated range buffer.

10. A method for optimizing life of a battery pack in a plug-in vehicle, the method comprising:

measuring battery performance data of the battery pack via a plurality of sensors, including measuring an open-circuit voltage of the battery pack;

determining a position of the vehicle using position data received via a global positioning system (GPS) receiver;

monitoring degradation of the battery pack over time via a controller using the measured battery performance data;

determining a driving history and a battery charging history for an operator of the vehicle using the measured battery performance data and a position signal from the GPS receiver, wherein the driving history and battery charging history identify the days, hours, and/or locations at which the operator drives the vehicle and charges the battery pack, respectively;

determining a plurality of SOC breakpoints between an actual SOC of the battery pack and a control target SOC;

identifying, via the controller from among a plurality of state of charge (SOC) data bins each configured to store a corresponding portion of the measured battery performance data for a predetermined SOC range, multiple incomplete/stale SOC data bins within the SOC break points that are missing battery performance data or contain old battery performance data relative to a calibrated aging threshold;

selecting a highest priority breakpoint by evaluating each of the multiple incomplete/stale SOC data bins against an age criterion and/or a lack of data criterion;

identifying, from the multiple incomplete/stale SOC data bins, an incomplete/stale SOC data bin that corresponds to the selected highest priority breakpoint;

automatically controlling a charging operation of the battery pack via the controller using a charging control signal until the actual SOC of the battery pack is within an SOC range defining the incomplete/stale SOC data bin that corresponds to the selected highest priority breakpoint;

determining, while the actual SOC of the battery pack is within the SOC range that defines the incomplete/stale SOC data bin, new battery performance data of the battery pack that corresponds to the incomplete/stale SOC data bin; and recording the new battery performance data for the incomplete/stale SOC data bin, thereby optimizing the life of the battery pack.

11. The method of claim 10, wherein automatically controlling the charging operation includes automatically delaying charging of the battery pack for a predetermined duration after the battery pack has been plugged into an offboard power supply.

12. The method of claim 10, wherein the plurality of sensors includes a current sensor operable for detecting a charging current of the charging operation, and a temperature sensor operable for measuring a temperature of the battery pack, and wherein measuring the battery performance data further includes measuring the charging current and the temperature.

13. The method of claim 10, wherein the vehicle further includes a thermal conditioning device operable for thermally conditioning the battery pack, and wherein automatically controlling the charging operation further includes controlling an operation of the thermal conditioning device in response to the temperature of the battery pack.

14. The method of claim 13, wherein controlling an operation of the thermal conditioning device includes derating a charging current level to the battery pack to maintain the SOC of the battery pack until the thermal conditioning of the battery pack is complete.

15. The method of claim 10, further comprising:
receiving an override signal from a user interface of the plug-in vehicle using the controller, and
automatically controlling the charging operation by charging the battery pack to a default SOC in response to receipt of the override signal.

16. The method of claim 10, further comprising:
determining, from the position signal received from the GPS receiver, an elevation of the plug-in vehicle, and
scheduling the charging operation to coincide with a regenerative event of the vehicle using the elevation of the plug-in vehicle.

17. The method of claim 10, further comprising:
receiving a designated range buffer via a user interface of the plug-in vehicle, and
automatically controlling the charging operation using the designated range buffer such that the battery pack, upon completing a charging event, has an estimated range that equals or exceeds a range of the designated range buffer.

18. The system of claim 1, wherein the controller is further programmed to estimate a respective remaining operating range of the plug-in vehicle for each of the SOC data bins based on the corresponding portion of the battery performance data stored in each of the SOC data bins.

19. A method for automating a charging operation of a battery pack of an electric drive vehicle, the method comprising:
receiving, via a vehicle controller from a plurality of sensors, battery performance data of the battery pack, the battery performance data including an open-circuit voltage, a state of charge (SOC) level, a charging current, and/or a battery pack temperature;
receiving position data of the vehicle from a global positioning system (GPS);
determining, via the vehicle controller, a driving history and a battery charging history for an operator of the vehicle using the battery performance data and the position data from the GPS system;
determining, via the vehicle controller, a degradation of the battery pack using the battery performance data, the driving history, and the battery charging history;
determine a plurality of SOC breakpoints between an actual SOC of the battery pack and a control target SOC for the battery pack;
identifying, via the vehicle controller from a series of SOC data bins each storing a corresponding portion of the battery performance data for a predetermined SOC range, multiple incomplete/stale SOC data bins within the SOC breakpoints that are missing battery performance data or contain old battery performance data relative to a calibrated aging threshold;
selecting a highest priority incomplete/stale SOC data bin by evaluating each of the multiple incomplete/stale SOC data bins against an age criterion and/or a lack of data criterion;
automatically controlling, via the vehicle controller, the charging operation of the battery pack until the actual SOC of the battery pack is within the predetermined SOC range defining the highest priority incomplete/stale SOC data bin;
determining, while the actual SOC of the battery pack is within the SOC range that defines the highest priority incomplete/stale SOC data bin, new battery performance data of the battery pack that corresponds to the highest priority incomplete/stale SOC data bin; and
estimating a respective remaining operating range of the electric drive vehicle for the highest priority incomplete/stale SOC data bin based on the new battery performance data.

* * * * *